(12) United States Patent
Fischer et al.

(10) Patent No.: US 7,497,469 B2
(45) Date of Patent: Mar. 3, 2009

(54) AIRBAG FOR A VEHICLE OCCUPANT RESTRAINT SYSTEM

(75) Inventors: Anton Fischer, Schechingen (DE); Sven Hofmann, Schwaebisch Gmuend (DE)

(73) Assignee: TRW Automotive GmbH, Alfdorf (DE)

( * ) Notice: Subject to any disclaimer, the term of this patent is extended or adjusted under 35 U.S.C. 154(b) by 0 days.

(21) Appl. No.: 11/825,152

(22) Filed: Jul. 5, 2007

(65) Prior Publication Data

US 2008/0007038 A1 Jan. 10, 2008

(30) Foreign Application Priority Data

Jul. 7, 2006 (DE) .................... 10 2006 031 542

(51) Int. Cl.
*B60R 21/16* (2006.01)
(52) U.S. Cl. .................................. 280/743.2
(58) Field of Classification Search .............. 280/730.2, 280/739, 743.2
See application file for complete search history.

(56) References Cited

U.S. PATENT DOCUMENTS

| | | | | |
|---|---|---|---|---|
| 6,773,030 | B2 * | 8/2004 | Fischer ....................... | 280/739 |
| 6,932,385 | B2 * | 8/2005 | Hawthorn et al. ........... | 280/739 |
| 7,059,634 | B2 | 6/2006 | Bossecker et al. | |
| 7,261,319 | B2 * | 8/2007 | DePottey et al. ............ | 280/739 |
| 2004/0012179 | A1 | 1/2004 | Pinsenschaum et al. | |
| 2007/0080530 | A1 | 4/2007 | Issler et al. | |

FOREIGN PATENT DOCUMENTS

| | | |
|---|---|---|
| DE | 19640322 | 3/1998 |
| DE | 10236859 | 2/2004 |
| DE | 202006002496 | 8/2006 |
| EP | 0599378 | 11/1993 |

* cited by examiner

*Primary Examiner*—John Q. Nguyen
*Assistant Examiner*—Robert A. Coker
(74) *Attorney, Agent, or Firm*—Tarolli, Sundheim, Covell & Tummino LLP

(57) ABSTRACT

An airbag (10) for a vehicle occupant restraint system includes an airbag wall (14) having a gas outlet opening (26), and a control strap (16) extending through an interior of the airbag along an airbag depth (y) that is defined by a distance between two airbag wall areas (27, 28), the airbag wall areas (27, 28) being situated opposite to each other and the airbag wall areas (27, 28) being joined to one another by the control strap (16). A wall section (20) is turned one of inside and outside relative to the inflated airbag (10), depending on the airbag depth (y), such that, in response to a displacement of the control strap (16), the airbag (10) can be moved from a first outer contour, in which the airbag depth (y) is large and the wall section (20) is turned into the interior of the airbag, to a second outer contour, in which the airbag depth (y) is smaller and the wall section (20) is turned outside. The airbag (10) has a closure (18) for the gas outlet opening (26) that is joined, on the one hand, to the control strap (16) and, on the other hand, to the wall section (20). The closure (18) can be actively moved in opposite directions respectively by the control strap (16) and the wall section (20), in order to open and close the gas outlet opening (26) to one of a greater and lesser extent.

18 Claims, 3 Drawing Sheets

AIRBAG FOR A VEHICLE OCCUPANT RESTRAINT SYSTEM

TECHNICAL FIELD

The invention relates to an airbag for a vehicle occupant restraint system, including an airbag wall having a gas outlet opening, and a control strap extending through an interior of the airbag along an airbag depth that is defined by a distance between two airbag wall areas that are situated opposite to each other and that are joined to one another by the control strap, a wall section being turned inside or outside relative to the inflated airbag, depending on the airbag depth.

BACKGROUND OF THE INVENTION

Such an airbag has already been disclosed in the generic German patent application DE 102 36 859 A1 in which the wall section that can be turned inside or outside is a tube-like wall section that has a gas outlet opening. A first end of the control strap is fastened to the tube-like wall section near the gas outlet opening and a second, opposite end of the control strap is attached to the airbag wall. The length of the control strap and the attachment point of the second end of the control strap are selected such that the control strap is tensioned while the airbag unfolds largely unhindered, and the tube-like wall section along with the gas outlet opening is pulled into the interior of the airbag. As a result of the pressure prevailing inside the airbag, the tube-like wall section is compressed such that the gas outlet opening is closed. Consequently, in the case of an optimal restraint position of the vehicle occupant and thus under good airbag unfolding conditions, undesired gas loss is minimized. In contrast, if the vehicle occupant is situated in an unfavorable restraint position, for example too close to the airbag, the unfolding of the airbag is hindered. In this case, the control strap does not become tensioned, so that the tube-like wall section is turned outside and the gas outlet opening is released. In this manner, an excessive airbag hardness is prevented when the vehicle occupant is in an unfavorable restraint position.

A drawback of the described airbag is that the opening cross section of the gas outlet opening cannot be varied or adapted. The opening is either essentially completely closed or completely open. However, an adaptation of the outflow cross section that can be regulated, preferably passively regulated, would be desirable in order to improve the restraint values of the airbag.

Therefore, it is an object of the invention to create an airbag with a gas outlet opening, the gas outlet opening providing an outflow cross section being controllable, preferably reversibly and path-dependently controllable, by a passive regulation device.

BRIEF SUMMARY OF THE INVENTION

This is achieved in an airbag for a vehicle occupant restraint system including an airbag wall having a gas outlet opening, and a control strap extending through an interior of the airbag along an airbag depth that is defined by a distance between two airbag wall areas, the airbag wall areas being situated opposite to each other and the airbag wall areas being joined to one another by the control strap. A wall section is turned one of inside and outside relative to the inflated airbag, depending on the airbag depth, such that, in response to a displacement of the control strap, the airbag can be moved from a first outer contour, in which the airbag depth is large and the wall section is turned into the interior of the airbag, to a second outer contour, in which the airbag depth is smaller and the wall section is turned outside. The airbag has a closure for the gas outlet opening that is joined, on the one hand, to the control strap and, on the other hand, to the wall section. The closure can be actively moved in opposite directions respectively by the control strap and the wall section, in order to open and close the gas outlet opening to one of a greater and lesser extent. The closure and the control strap are thus constantly kept under tension by the wall section that can be turned inside or outside, so that, in case the airbag depth changes, the closure is moved in order to release the gas outlet opening to a greater or lesser extent. Hence, in a simple manner, an adaptive gas outlet opening is created that can be regulated at least partially reversibly as well as path-dependently and consequently passively.

In one embodiment of the airbag, the gas outlet opening is essentially closed when the airbag assumes the first outer contour. The first outer contour is characterized by a large airbag depth, that is to say, optimal airbag unfolding conditions. From this, it can be concluded that the vehicle occupant is in a good restraint position. Due to the essentially closed gas outlet opening, gas losses are avoided so that an airbag hardness is established that is advantageous for vehicle occupants who are in a good restraint position.

In another embodiment, the gas outlet opening is at least partially released when the airbag assumes the first outer contour. In this case, the airbag is configured such that the large airbag depth of the first outer contour allows the conclusion that the vehicle occupant restraint system has deployed erroneously and that the airbag can consequently be deflated.

Preferably, the airbag can be changed from the first outer contour via an intermediate contour into the second outer contour, the gas outlet opening being essentially closed by the closure in the intermediate contour. The airbag contours differ essentially in terms of the wall section that is turned inside or outside to a greater or lesser extent as well as in terms of different airbag depths. As mentioned above, in one embodiment of the airbag, at a very large airbag depth in the first outer contour, it can be concluded that the vehicle occupant restraint system has deployed erroneously so that the airbag has to be deflated. At a very small airbag depth, the airbag is already so compressed that, as a rule, a pressure relief seems to be called for in order to prevent the airbag from becoming too hard to optimally restrain a vehicle occupant. Between the extreme cases of the first and second outer contours, the airbag assumes an intermediate contour that allows the conclusion that a restraint event has taken place. An outflow of gas is advantageously prevented here and only becomes increasingly possible as the first or second outer contour is approached.

In another embodiment of the airbag, the closure is a flexible fabric strap. Fabric straps are inexpensive and easy to manufacture in various shapes and lengths. Moreover, as a rule, the airbag wall is made of a relatively tear-proof fabric that is available as a suitable material.

Here, the closure can be produced in one piece with the control strap. This is especially practical if the closure and the control strap are made of a fabric, especially the airbag fabric. In this case, the effort involved in connecting the control strap and the closure is eliminated.

The closure is preferably guided over the gas outlet opening and has a closure opening, said closure being able to be moved such that the closure opening is adjacent to the gas outlet opening in order to release the gas outlet opening. Thanks to this configuration of the closure, it is very simple to regulate the outflow cross section of the gas outlet opening merely by continuously moving the closure.

A closure guide can be provided on the airbag wall, said closure guide guiding said closure at least in sections along the airbag wall. The closure guide is most advantageously provided in the area of the gas outlet opening so that the closure adjoins the airbag wall especially closely there, preferably lies tight against it. In this manner, an undesired leakage flow is largely prevented.

Most preferably, the closure guide is arranged inside the airbag and is attached to the airbag wall. First of all, this means that no opening is needed in the airbag wall through which the control strap or the closure has to pass to the outside. Secondly, the control strap, the closure and the closure guide are located inside the airbag and are thus largely protected against external influences that could impair the function of these components.

In another embodiment, an unfolding force acting on the airbag wall and being oriented radially outwards with respect to the inflated airbag is greater at an attachment point of the control strap to the airbag wall than it is at an attachment point of the closure to the airbag wall. This entails the advantage that, whenever possible, the airbag will form the predefined first outer contour with the greatest possible airbag depth. If this airbag depth is not reached or if it is reduced due to external influences, the unfolding force at the attachment point between the closure and the airbag wall is still sufficient to keep the closure and the control strap under tension and to move them.

The wall section being turned to one of inside or outside can be configured as a bladder-like projection of the airbag wall. Such a projection is simple to manufacture and can be folded especially well to the inside or to the outside relative to the inflated airbag. Moreover, the unfolding force at the attachment site between the closure and the control strap can be established very well by making minimal changes to the bladder-like projection.

DETAILED DESCRIPTION OF THE PREFERRED EMBODIMENTS

Figure 1:
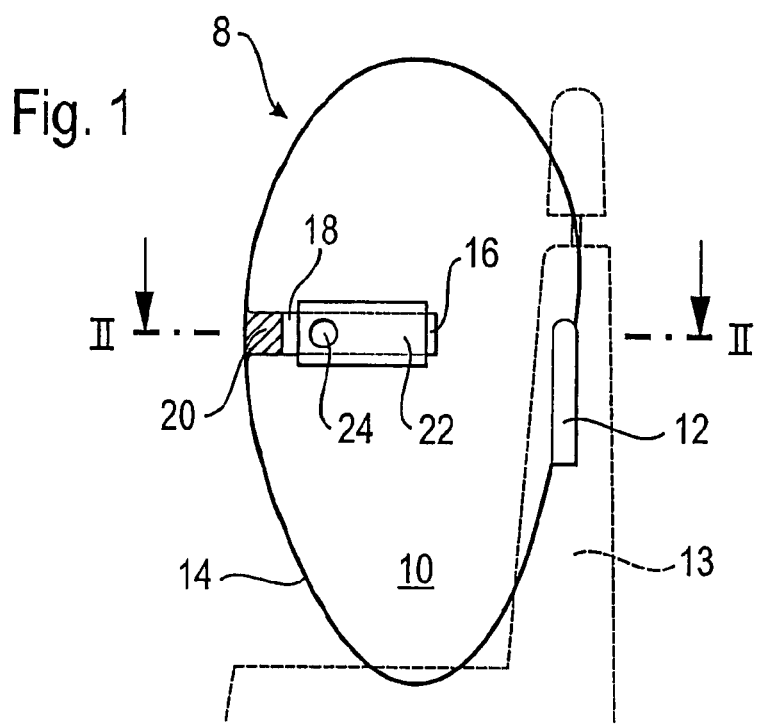
FIG. 1 shows a schematic vertical section of an airbag according to the invention that has assumed a first outer contour.

By way of example, FIG. 1 shows an airbag module 8 with an airbag 10 according to the invention and a gas generator 12. On the basis of the shape and positioning of the gas generator 12, it is clear that the depicted module is a side-impact airbag module that is preferably integrated into the backrest of a vehicle seat 13, although the invention is not limited to such modules. The figure shows a schematic vertical section through the gas generator 12 and through an airbag wall 14 of the airbag 10. Moreover, a control strap 16 has been cut approximately in the middle of the airbag 10, this control strap 16 extending perpendicular to the plane of projection through the interior of the airbag along an airbag depth y (see FIG. 2). The control strap 16 is connected to a closure 18 that extends to the left on the inner surface of the airbag wall 14, as shown in FIG. 1, and that is attached to a wall section 20 being turned or folded towards the interior of the inflated airbag 10 and being depicted by cross-hatching in FIG. 1. In order to adjoin the airbag wall 14 as close as possible, preferably lie tight against it, the closure 18 is, at least in sections, guided along the airbag wall 14. For this purpose, a closure guide 22 is provided that is arranged in the interior of the airbag 10 and that is attached to the airbag wall 14. A closure guide opening 24 can be seen in the closure guide 22, the latter being fastened to the airbag wall 14 in such a way that this closure guide opening 24 lies precisely over a gas outlet opening 26 of the airbag wall 14 (see FIG. 2).

The control strap 16, the closure 18 and the closure guide 22 are all made of a flexible material, preferably of a fabric and most preferably of the airbag fabric, so that it can readily adapt to the curved airbag contour. By using the airbag fabric that is present anyway, the above-mentioned components can be produced very inexpensively and can be joined to each other simply by stitched seams. As an alternative, the closure is made, for example, of a film or foil strip. In this context, it should still be clear that the control strap 16 and the closure 18 can also make an integrally shaped transition from one to the other in order to minimize the assembly work.

Figure 2:
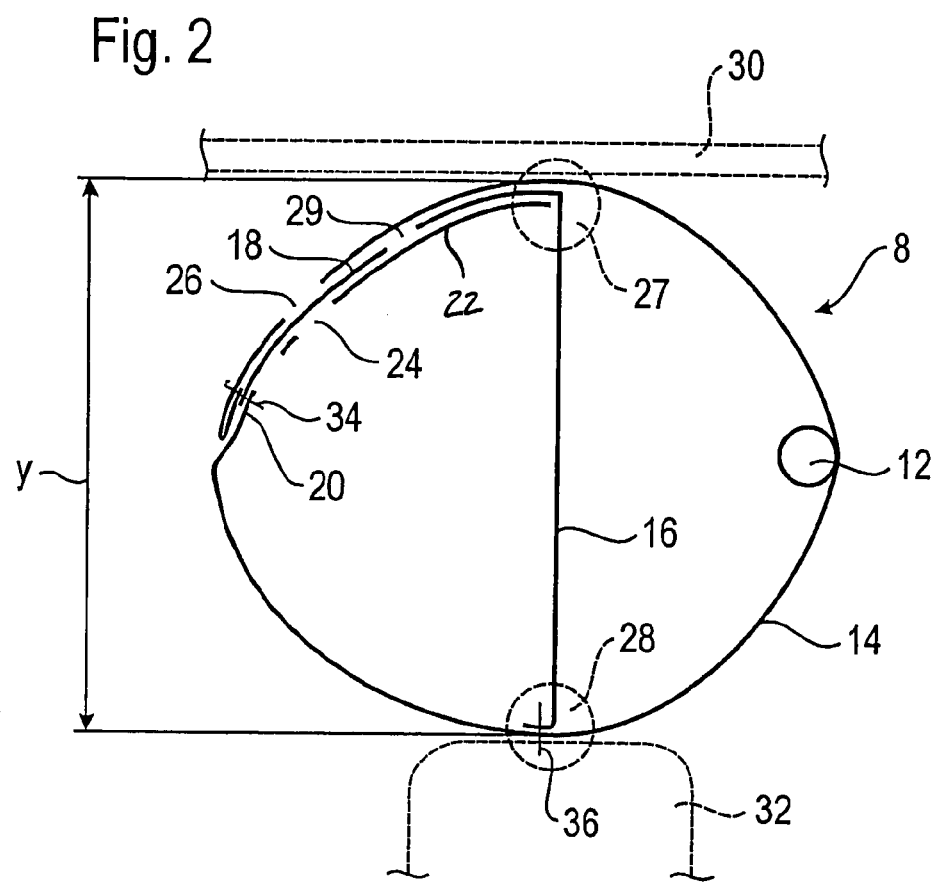
FIG. 2 shows a schematic horizontal section II-II of the airbag according to the invention depicted in FIG. 1.

FIG. 2 shows a schematic horizontal section II-II of the airbag module 8 depicted in FIG. 1. In this case, the control strap 16 and the closure 18 are carried out as a one-piece fabric strap, with the section of the fabric strap that extends through the interior of the airbag 10 along the airbag depth y being designated as the control strap 16 and the section of the fabric strap that extends along the airbag wall 14 being designated as the closure 18. Here, the control strap 16 couples two airbag wall areas 27, 28 that lie essentially opposite to each other, and the airbag depth y is defined as the distance between these airbag wall areas 27, 28. In FIG. 2, the airbag 10 has reached its maximum airbag depth y and forms a first outer contour, the wall section 20 being turned into the interior of the airbag 10. In the embodiment shown, the gas outlet opening 26 is essentially closed in the first outer contour of the airbag 10, since a closure opening 29 of the closure 18 is offset with respect to the gas outlet opening 26 and the closure guide opening 24 lying above each other. Consequently, the closure 18 being guided along the airbag wall 14 covers the gas outlet opening 26 virtually gas-tight in this position.

Figure 3:
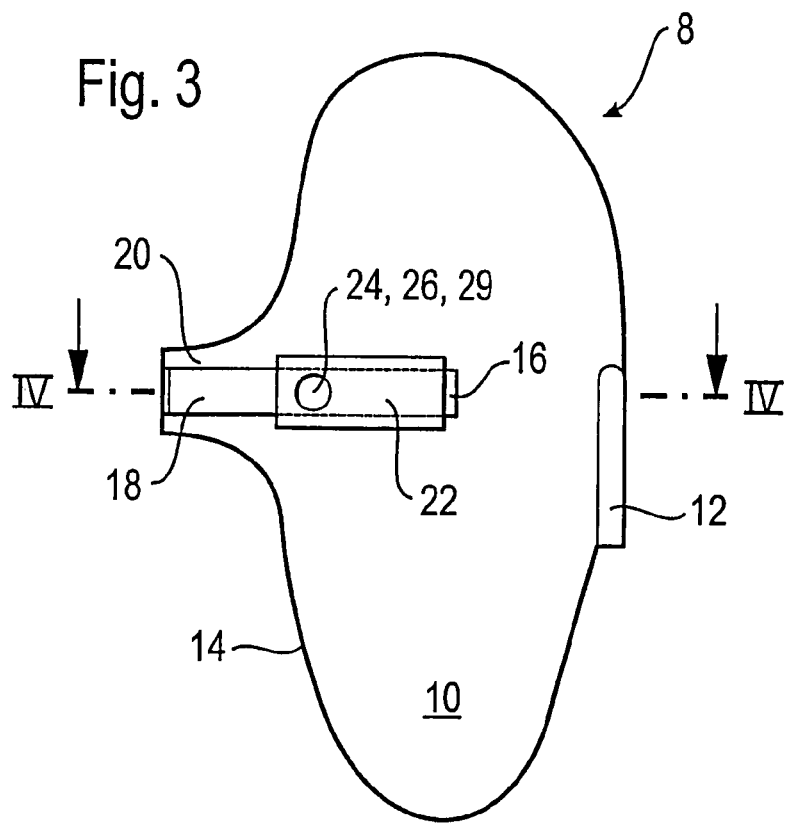
FIG. 3 shows a schematic vertical section of an airbag according to the invention that has assumed a second outer contour.
Figure 4:
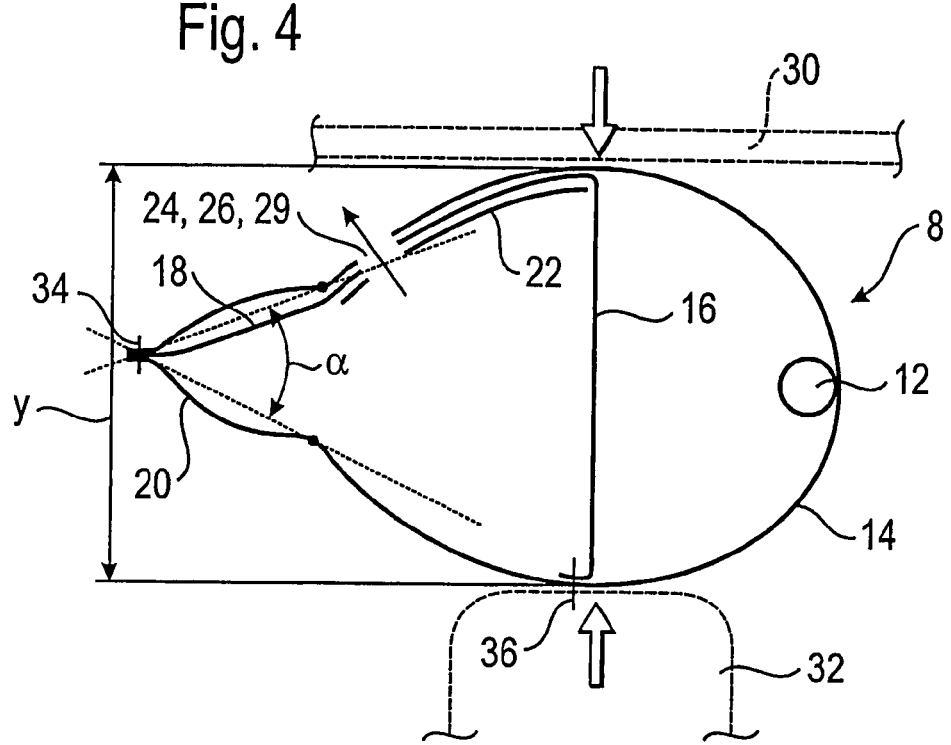
FIG. 4 shows a schematic horizontal section IV-IV of the airbag according to the invention depicted in FIG. 3.

The sections of the airbag module 8 shown in FIGS. 3 and 4 correspond to the sections according to FIGS. 1 and 2, although the airbag 10 has assumed a second outer contour in which the airbag depth y is smaller and the wall section 20 is turned outside (FIG. 4). The airbag depth y, which is less than in FIG. 2, is created by the greater proximity between a vehicle part 30 (e.g. a door cladding) and a vehicle occupant 32. Owing to this reduced airbag depth y, the closure 18 is moved such that the closure opening 29 lies at least partially over the gas outlet opening 26 and the closure guide opening 24. Consequently, in the second outer contour of the airbag 10, gas can flow out of the interior of the airbag 10, leading to a corresponding pressure relief.

Below, the functional principle for moving the closure 18 will be briefly discussed: after the activation of the gas generator 12, generator gas is fed into the interior of the airbag 10 so that internal pressure builds up. Due to this internal pressure, each area of the airbag wall 14 is subjected to an unfolding force that is oriented radially outwards, referring to the inflated airbag 10. In this process, the flexible airbag wall 14 is deformed in such a way that the airbag 10, with its predefined surface area, assumes the largest possible volume. Therefore, without any external influence by the vehicle part 30 or by the vehicle occupant 32, the airbag generally strives to achieve the most spherical shape possible, that is to say, to move the areas 27, 28 as far away from each other as possible. The blank of the airbag wall 14 of the airbag 10 according to the invention is cut such that the wall section 20 can be turned inside or outside relative to the inflated airbag 10. Here, it is especially advantageous to configure this wall section 20 as a bladder-like projection (FIGS. 1 to 4). An unfolding force of the airbag wall 14 that occurs in the area of this bladder-like projection is less than the unfolding force of the airbag wall 14 outside of this projection. If, as can be seen in FIG. 4, an attachment point 34 of the closure 18 to the airbag wall 14 is selected in the area of the projection and an attachment point 36 is selected between the control strap 16 and the airbag wall 14 outside of this bladder-like projection, it is clear that the airbag 10 will assume the spherical first outer contour according to FIG. 2 as it unfolds freely. Only when the airbag depth y is reduced due to external influences, the bladder-like projection can move radially outwards while moving the closure 18, until the bladder-like projection is finally turned outside and the airbag 10 assumes the second outer contour (FIG. 4). The mentioned external influence that leads to a reduced airbag depth y is shown in FIG. 4 by vertical arrows and can either result from a movement of the vehicle occupant 32 towards the vehicle part 30 or else can be due to a deformation of the vehicle part 30 towards the vehicle occupant 32.

Therefore, the second outer contour according to FIG. 4 can already be assumed immediately when the airbag 10 unfolds, if the vehicle occupant 32 is situated in an unfavorable restraint position by being too close to the vehicle part 30. However, the airbag 10 can also assume the first outer contour initially and change to the second outer contour due to a movement of the vehicle occupant 32 or due to a deformation of the vehicle part 30. As a result of the reduced volume of the airbag 10 in the second outer contour, compared to the first outer contour, the internal pressure in the airbag 10 rises considerably. Therefore, a pressure relief is desirable in both scenarios, that is to say, in case of an unfavorably positioned vehicle occupant 32 and/or in case of an airbag deformation after a restraint event.

Due to external interfering contours such as the vehicle part 30 or the vehicle occupant 32, as a rule, the airbag 10 cannot assume the first outer contour that it strives to assume because of the functional principle described above. Between the extreme cases of the first and second outer contours, however, the airbag 10 always forms an intermediate contour with the largest possible airbag depth y. The airbag depth y is continuously adapted, and this adaptation is reversible when the interfering contours move accordingly. When the airbag depth y is adapted, the closure 18 is moved accordingly so that the closure opening 29 and the gas outlet opening 26 overlap to a greater or lesser extent. Consequently, the gas outlet opening 26 can also be opened reversibly and continuously or it can at least partially be closed again. Such a path-dependent, partially reversible adaptation of the outflow cross section of the gas outlet opening 26 offers advantages in restraining the vehicle occupant 32.

The magnitude of the unfolding force can be adjusted very readily via a flank angle α when the wall section 20 is configured as a bladder-like projection. This flank angle α is drawn in FIG. 4 with a dotted line connecting an end of the bladder-like projection to a beginning, the latter referring to the transition of the airbag wall 14 to the bladder-like projection. The smaller the flank angle α is selected, the smaller the unfolding force that acts on the airbag wall 14 and that is oriented radially outwards in the area of the attachment point 34 between the closure 18 and the airbag wall 14. As the flank angle α becomes larger, this unfolding force at the attachment point 34 increasingly approaches the unfolding force at the attachment point 36 between the control strap 16 and the airbag wall 14.

Figure 5:
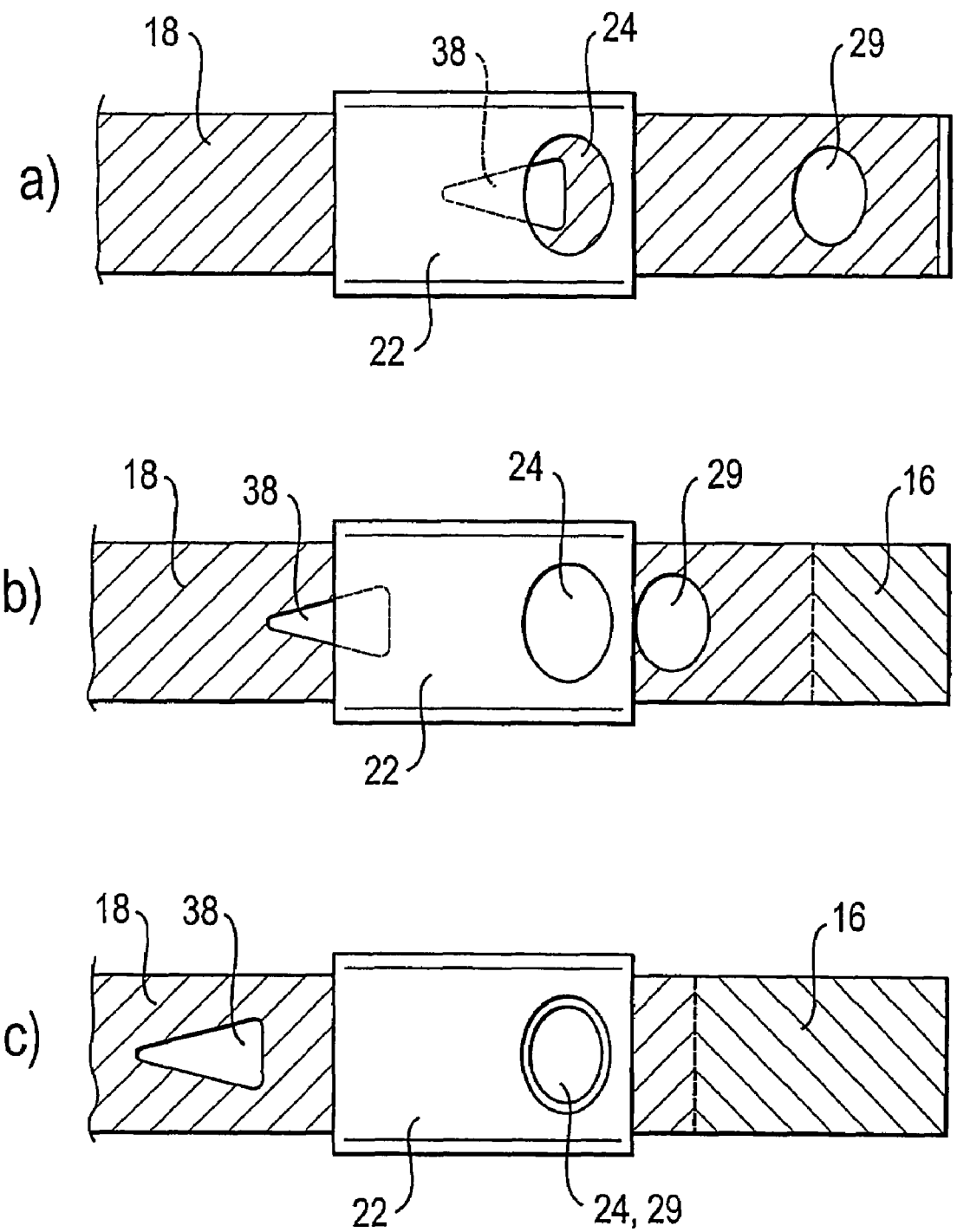
FIGS. 5a and 5c show schematic detailed views of a closure of the airbag according to the invention.

FIGS. 5a to 5c each show the closure 18 and the closure guide 22 in detail, the closure 18 being moved in a manner corresponding to the associated outer contour of the airbag 10. The position of the closure 18 corresponds to the first outer contour in FIG. 5a, to an intermediate contour in FIG. 5b and to the second outer contour of the airbag 10 in FIG. 5c. Unlike FIGS. 1 to 4, in FIGS. 5a to 5c, aside from the closure opening 29, an additional closure opening 38 can also be seen, which is drawn as an opening with a triangular cross section by way of example. This additional closure opening 38 is advantageous in embodiments of the airbag 10 in which the airbag 10 can only assume its first outer contour and thus its maximum airbag depth y in case the vehicle occupant restraint system has deployed erroneously. It is assumed that this maximum airbag depth between the vehicle occupant 32 and the vehicle part 30 is only achieved when the vehicle part 30 has not deformed or moved in the direction towards the vehicle occupant 32 as a result of a collision, and consequently that an erroneous deployment of the gas generator 12 has taken place.

The invention claimed is:

1. An airbag for a vehicle occupant restraint system, including
    an airbag wall (14) having a gas outlet opening (26), and
    a control strap (16) extending through an interior of said airbag along an airbag depth (y) that is defined by a distance between two airbag wall areas (27, 28), said airbag wall areas (27, 28) being situated opposite to each other and said airbag wall areas (27, 28) being joined to one another by said control strap (16),
    a wall section (20) being turned one of into and out of said interior of said inflated airbag (10), depending on said airbag depth (y), such that, in response to a displacement of said control strap (16), said airbag (10) can be moved from a first outer contour, in which said airbag has a first depth (y) and said wall section (20) is turned into said interior of said airbag, to a second outer contour, in which said airbag has a second depth (y) being less than said first depth and said wall section (20) is turned out of said interior of said airbag (10),
    said airbag (10) having a closure (18) for said gas outlet opening (26), said closure being connected to said control strap (16) and to said wall section (20),
    said closure (18) being able to be actively moved in a first direction by said control strap (16) and in a second, opposite direction by said wall section (20) in order to continuously regulate an outflow cross section of said gas outlet opening (26).

2. The airbag according to claim 1, wherein said gas outlet opening (26) is essentially closed when said airbag (10) assumes said first outer contour.

3. The airbag according to claim 1, wherein said gas outlet opening (26) is at least partially opened when said airbag (10) assumes said first outer contour.

4. The airbag according to claim 3, wherein said airbag (10) can be changed from said first outer contour via an intermediate contour into said second outer contour, said gas outlet opening (26) being essentially closed by said closure (18) in said intermediate contour.

5. The airbag according to claim 1, wherein said closure (18) is a flexible fabric strap.

6. The airbag according to claim 1, wherein said closure (18) is produced in one piece with said control strap (16).

7. The airbag according to claim 1, wherein said closure (18) is guided over said gas outlet opening (26) and has a closure opening (29), said closure (18) being able to be moved such that said closure opening (29) is adjacent to said gas outlet opening (26) in order to open said gas outlet opening (26).

8. The airbag according to claim 1, wherein a closure guide (22) is provided on said airbag wall (14), said closure guide (22) guiding said closure (18) at least in sections along said airbag wall (14).

9. The airbag according to claim 8, wherein said closure guide (22) is arranged inside said airbag and is attached to said airbag wall (14).

10. The airbag according to claim 1, wherein an unfolding force acting on said airbag wall (14) and being oriented radially outwards with respect to said inflated airbag (10) is greater at an attachment point (36) of said control strap (16) to said airbag wall (14) than it is at an attachment point (34) of said closure (18) to said airbag wall (14).

11. The airbag according to claim 1, wherein said wall section (20) turned to one of into and out of said interior of said inflated airbag is configured as a projection of said airbag wall (14).

12. An airbag for a vehicle occupant restraint system, comprising:
an airbag wall (14) that helps define an interior of said airbag (10), said airbag wall (14) comprising a gas outlet opening (26);
a control strap (16) positioned within the interior of said airbag (10), said control strap (16) having a first portion joined to a first airbag wall area (28) and a second portion joined to a closure (18) at a second airbag wall area (27) opposing said first airbag wall area (28), said closure (18) having a portion adapted to be guided along said airbag wall (14);
a wall section (20) of said airbag wall (14) joined to said closure (18), said wall section (20) having a first condition folded into said interior of said airbag (10) and a second condition unfolded out of said interior of said airbag (10), said closure (18) being adapted to block inflation fluid flow through said gas outlet opening (26) when said wall section (20) is in said first condition and being adapted to permit inflation fluid flow through said gas outlet opening (26) when said wall section (20) is in said second condition;
said closure (18) being adapted to be actively moved in a first direction along said airbag wall (14) by said control strap (16) and in a second, opposite direction along said airbag wall (14) by said wall section (20) in order to continuously regulate an outflow cross section of said gas outlet opening (26).

13. The airbag recited in claim 12, wherein said control strap (16) is adapted to move said closure (18) in said first direction along said airbag wall (14) in response to an increase in airbag depth (y) and said wall section (20) is adapted to move said closure in said second direction in response to an increase in airbag depth (y).

14. The airbag recited in claim 13, wherein said control strap (16) is adapted to maintain said wall section (20) in said first condition folded into said interior of said airbag (10) in response to deployment of said airbag (10) to a fully inflated depth (y).

15. The airbag recited in claim 13, wherein said wall section (20) is adapted to unfold out of said interior of said airbag (10) in response upon restricted deployment of said airbag (10) that prevents said airbag (10) from reaching a fully inflated depth (y).

16. The airbag recited in claim 13, wherein said wall section (20) is adapted to move said closure (18) in said second direction when said wall section (20) unfolds out of said interior of said airbag (10).

17. An airbag for a vehicle occupant restraint system, including
an airbag wall (14) having a gas outlet opening (26),
a control strap (16) connected to said airbag wall (14) and extending through an interior of said airbag, said control strap (16) being connected to a closure (18) that is movable relative to said gas outlet opening (26), and
a wall section (20) of the airbag wall (14) connected to said closure (18), said wall section (20) having a first condition turned into said interior of said airbag (10) when deployment of said airbag (10) is unobstructed, said control strap (16) moving said closure (18) to block gas flow through said gas outlet opening (26) when said wall section (20) is in said first condition, said wall section (20) having a second condition turned out of said interior of said air bag (10) when deployment of said airbag (10) is obstructed, said wall section (20) moving said closure (18) to allow gas flow through said gas outlet opening (26) when said wall section (20) is in said second condition.

18. The airbag recited in claim 17, wherein said closure (18) is adapted to continuously regulate an outflow cross section of said gas outlet opening (26) as said wall section (20) moves between said first and second conditions.

* * * * *